R. G. SMITH.
TOOL.
APPLICATION FILED MAY 13, 1919.
1,330,403.
Patented Feb. 10, 1920.
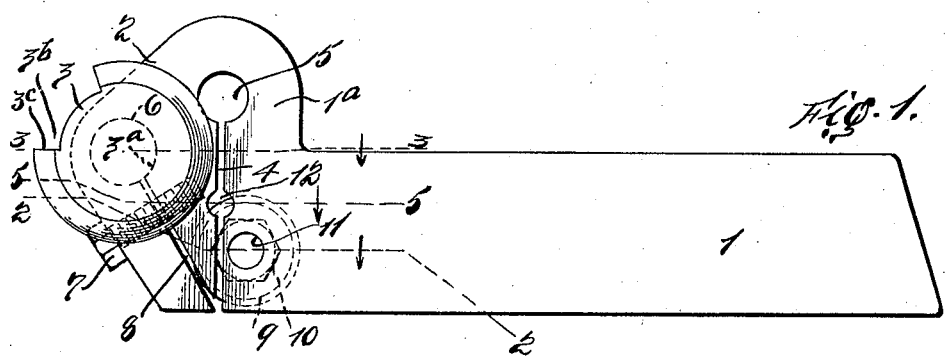
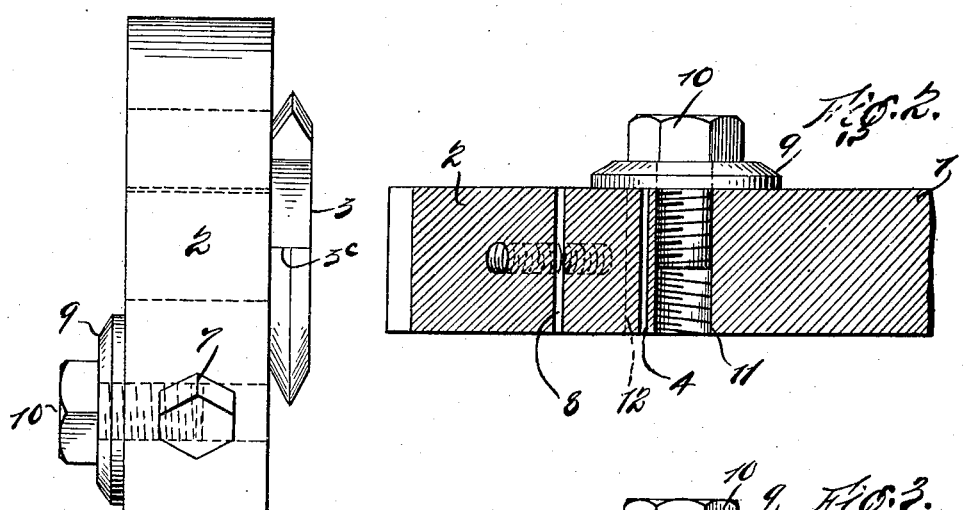
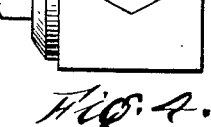
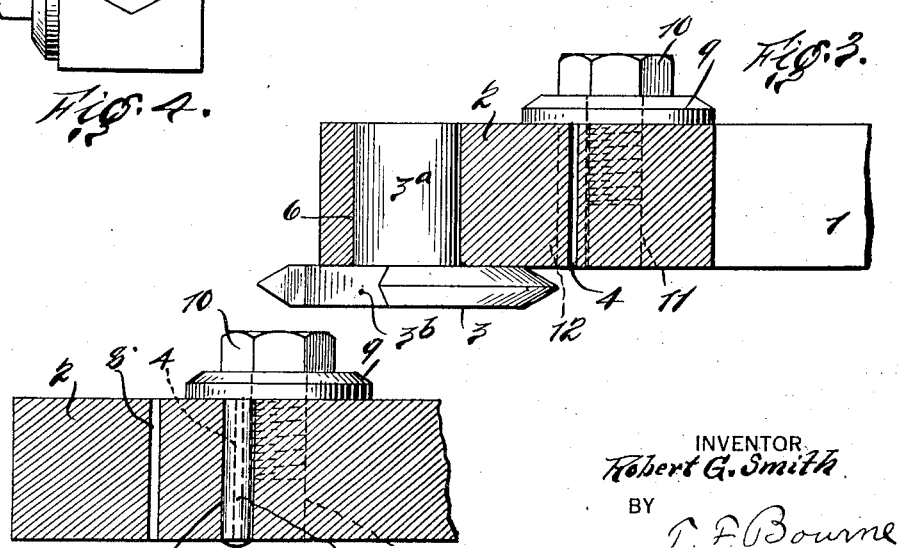
INVENTOR
Robert G. Smith
BY
T. F. Bourne
ATTORNEY

UNITED STATES PATENT OFFICE.

ROBERT G. SMITH, OF IRVINGTON, NEW JERSEY.

TOOL.

1,330,403.  Specification of Letters Patent.  Patented Feb. 10, 1920.

Application filed May 13, 1919. Serial No. 296,726.

*To all whom it may concern:*

Be it known that I, ROBERT G. SMITH, a citizen of the United States, and resident of Irvington, in the county of Essex and State of New Jersey, have invented certain new and useful Improvements in Tools, of which the following is a specification.

The object of my invention is to provide a holder for a cutter or tool, adapted particularly for use in lathes, shapers and planers, wherein the cutter will be securely held and may have a limited spring action against the work.

My invention comprises novel details of improvement and combinations of parts that will be more fully hereinafter set forth and then pointed out in the claims.

Reference is to be had to the accompanying drawings forming a part hereof in which—

Figure 1 is a side view of a tool embodying my invention;

Figs. 2 and 3 are sections on the lines 2—2 and 3—3 in Fig. 1, on an enlarged scale;

Fig. 4 is an end view of Fig. 1 on an enlarged scale; and

Fig. 5 is a detail on the line 5—5 in Fig. 1.

In the accompanying drawings the numeral 1 indicates a cutter or tool support, the shank portion of which is adapted to be held in a tool holder of a lathe, shaper or planer or other suitable machine in an ordinary manner. The head portion 1$^a$ of support 1 is provided with a resilient member 2 to support a cutter 3, for which purpose I have shown said head portion slit from the lower edge toward the upper portion at 4, a hole at 5 through the head portion 1$^a$ communicating with said slit, whereby the member 2 is supported in a resilient or spring-like manner. The cutter 3 is provided with a shank 3$^a$, preferably integral, fitted in a hole 6 in resilient member 2 and secured firmly in place by means of a screw 7 clamping the slit portions of the resilient member 2. The slit 8 extends to the hole 6 so that when the shank 3$^a$ is in said hole and screw 7 is tightened said shank will be secured in position. The cutter is shown in circular form and may have any suitable edge portion, a suitable part 3$^b$ of the cutter along said edge being removed providing a cutting edge 3$^c$. As the tool becomes dull the edge portion 3$^c$ may be ground, and since the shank 3$^a$ is circular to fit in the corresponding tubular hole 6 said cutter may be adjusted rotatively to any extent so that it is only necessary to grind the edge 3$^c$ sufficiently to sharpen it at any time. To resist side thrust of the resilient member 2 of support 1 I provide a stop 9 shown in the form of a disk receiving a screw 10 operative in a threaded hole 11 in the main portion of support 1 in such a manner that said stop bears firmly against said main portion but extends laterally against the side of the resilient member 2, shown extending over slot 4. Such construction permits member 2 to have a spring-like action by sliding along said stop while kept thereby from lateral motion. At 12 is indicated a hole formed in the opposing parts of the support 1 and resilient member 2 adapted to receive a pin 13 which may be driven into the said hole and serves like a wedge to resist thrust of the cutter.

When my improved tool is used against the work for ordinary operations the cutter will be clamped so that its cutting edge 3$^c$ will be in proper position, such as indicated in Fig. 1, and said cutter edge will be resiliently supported so as to accommodate itself to the work, whereby chattering of the tool will be avoided and relatively deep-like cuts in the work may be effected, since the tool by means of its spring support may move laterally from the work in the direction of the length of support 1 by reason of the fact that slit 4 extends in a direction transverse to the length of the support. The opposite faces of resilient member 2 of support 1 are shown parallel and flat so that the cutter may be adjusted on either side thereof according to the work to be done, and likewise the stop 9 and screw 10 may be adjusted on either side of the support to resist lateral thrust according to the side of the support on which the cutter 3 is placed. In case it is desired for some work that the cutter be supported rigidly the pin 13 may be inserted in hole 12 to resist rearward thrust of the cutter.

Having thus described my invention, what I claim and desire to secure by Letters Patent is:—

1. A tool comprising a support having a resilient head member flat on the opposite sides and having a hole passing therethrough, an integral cutter adapted to fit on either of said sides and having a shank adapted to fit in said hole through either of said sides, and means to adjustably clamp said shank circumferentially in said hole, the cutter and shank being rotative together, the cutter being held from rotation by said clamping means on said shank.

2. A tool comprising a support having a resilient head member, a cutter provided with means for attachment to said resilient member, and means to secure the cutter thereto, a stop upon the outside of the support on the side opposite the cutter to coöperate slidably with said member to prevent side motion thereof and permit said member to slide along the stop.

3. A tool comprising a support having a resilient head member, a cutter provided with means for attachment to said resilient member, means to secure the cutter thereto, a stop on the side of said support opposite the cutter, said stop and member having smoothly coöperating surfaces, and screw means to detachably secure the stop to the outside of the support to bear freely against the outside of the resilient member, and permit the latter to slide along the stop and prevent lateral movement of said member.

4. A tool comprising a support having a resilient head member, a cutter provided with means for attachment to said resilient member, means to secure the cutter thereto, said support having a transverse hole, a disk adapted to fit against said support and bear slidably against the resilient member, and means to detachably secure said disk to either side of said support at said hole.

5. A tool support provided with a head portion having a slot providing a resilient member, said member having a transverse hole and having a slit communicating therewith, a circular cutter located along the side of said member and having an integral lateral shank projecting from one side thereof and turnable in said hole, and a screw operative in a threaded hole in said resilient member adapted to clamp the shank of said cutter in set position securely in said hole to prevent rotation of the cutter.

Signed at New York in the county of New York and State of New York this 12th day of May, A. D. 1919.

ROBERT G. SMITH.